No. 895,749. PATENTED AUG. 11, 1908.
J. B. GURY.
GRINDING MACHINE.
APPLICATION FILED APR. 21, 1906.
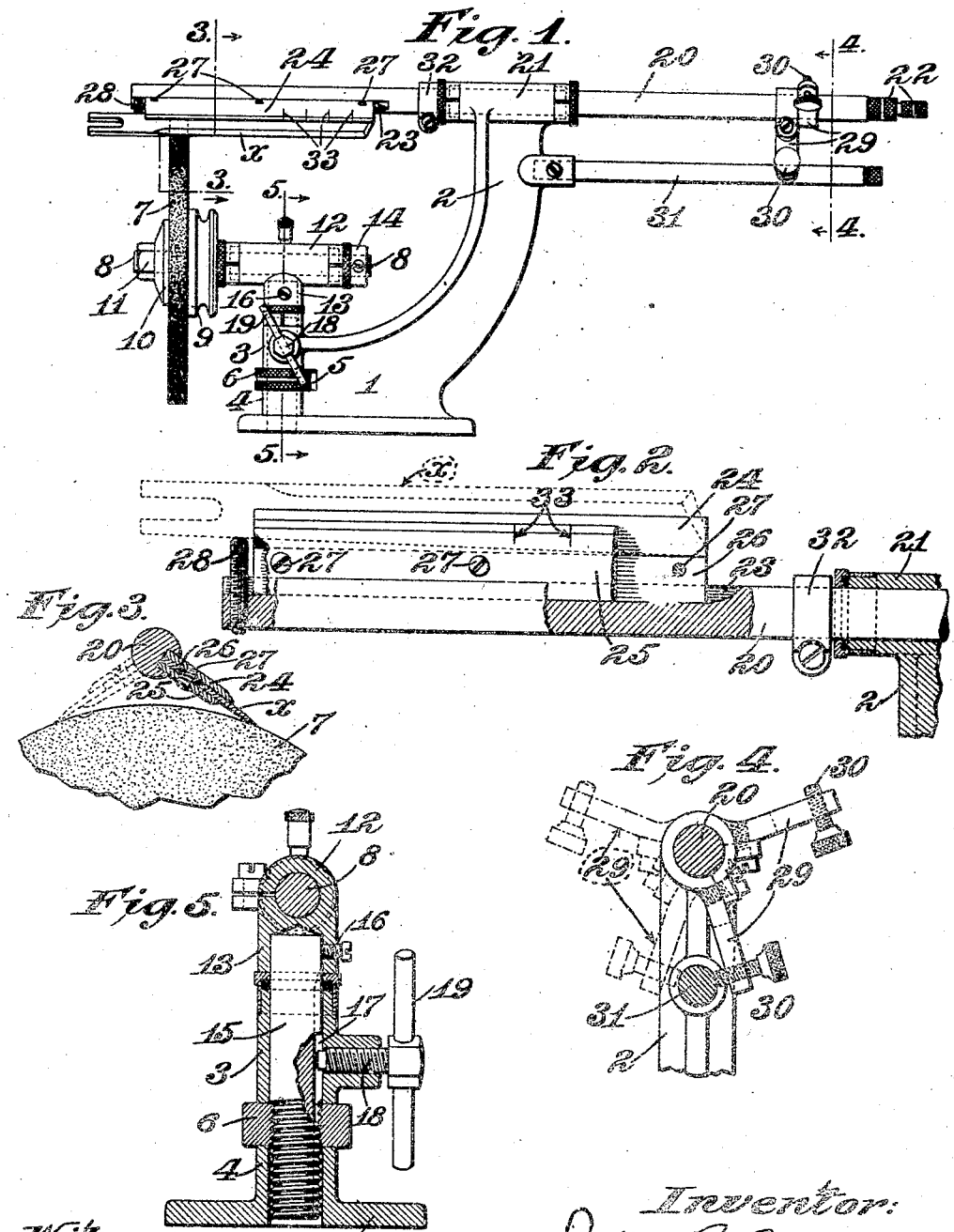

UNITED STATES PATENT OFFICE.

JOHN B. GURY, OF ST. LOUIS, MISSOURI.

GRINDING-MACHINE.

No. 895,749.  Specification of Letters Patent.  Patented Aug. 11, 1908.

Application filed April 21, 1906. Serial No. 312,962.

To all whom it may concern:

Be it known that I, JOHN B. GURY, a citizen of the United States, and a resident of the city of St. Louis and State of Missouri, have invented a new and useful Improvement in Grinding-Machines, of which the following is a specification.

My invention relates to grinding-machines, and especially to machines for sharpening cutting-knives.

It has for its principal objects to simplify and improve the knife-holding and manipulating mechanism of such machines; to provide for the adjustment of the bearing-support for the grinding wheel; and to attain other advantages hereinafter more fully appearing.

The invention consists in the parts and in the arrangements and combinations of parts hereinafter described and claimed.

In the accompanying drawings, which form part of this specification, and wherein like symbols refer to like parts wherever they occur, Figure 1 is a side view of my improved grinding-machine; Fig. 2 is an enlarged detail view of a portion of the knife-holding and manipulating mechanism of the machine, parts being broken away and shown in section; Fig. 3 is a detail sectional view on line 3—3 of Fig. 1, showing the coöperative relation of the knife-holder to the grinding-wheel; Fig. 4 is a detail sectional view on the line 4—4 of Fig. 1, showing the reverse positions of the adjustable stops for the knife-manipulating mechanism; and, Fig. 5 is a detail sectional view of the adjustable bearing-support for the grinding-wheel.

The machine comprises a supporting frame having a base portion 1 and an upstanding portion 2. The base portion of the frame is bifurcated horizontally and its forks are formed with two bearings 3 and 4 having their bores in vertical alinement. Seated within the slot 5 of the bifurcation, with its threaded opening in register with the alining bores in the bearing portions 3 and 4, is a knurled adjusting nut 6.

The grinding-wheel 7 is mounted on a spindle 8. The spindle 8 is provided with a shoulder 9, grooved to form a pulley, and forming an abutment for the grinding wheel when the clamping disk 10 and securing nut 11 are applied to said spindle on the opposite side of said wheel. The spindle 8 is mounted in a horizontal bearing 12 in a T-shaped support having a shank portion 13. A locking collar 14 is adjustably secured on the end of the spindle 8.

The shank portion 13 of the grinding-wheel support is formed with a socket for the reception of the upper end of a cylindrical post 15 which is fastened therein by a set-screw 16. The post is movably mounted in the bearings 3 and 4 provided therefor in the frame, and has its lower portion threaded to engage the threaded opening in the adjusting nut 6. An elongated groove 17 is formed in the post and extends longitudinally thereof. This groove is adapted to receive the reduced end of a locking screw 18 which works in a threaded boss on the bearing and is provided with a handle 19 by which the same may be turned.

The manipulating mechanism comprises an elongated cylindrical rod 20 slidingly and rotatably mounted in a horizontally arranged bearing 21 at the top of the extension 2 of the supporting frame. The rod 20 is provided at one end with knurled finger-holds 22 whereby it can be manipulated. The rod is also formed with a longitudinally disposed groove 23. In the groove 23 is tightly fitted the knife-holder comprising substantially an elongated grooved pocket having adjustable walls adapted to frictionally engage and hold a knife during the operation of sharpening. This pocket is preferably composed of two metallic strips 24 and 25 secured to an interposed relatively narrower spacing strip 26, by screws 27, and tightly forced into the groove 23 in the rod 20. The interposed spacing strip is slightly tapered or gradually reduced in thickness towards its outer edge, thus causing the outer strips 24 and 25 to converge at their outer edges when clamped against the faces of said strip 26 by tightening the screws 27. By loosening the screws 27, the strips 24 and 25 can be made to yield slightly upon the insertion of a knife-blade, and the holder can thus be made to accommodate blades of various thicknesses.

In practice, a blade of uniform width throughout its length is forced with its back edge into the space between the outer strips 24 and 25 until said back edge abuts against the edge of the interposed spacing strip 26. In order to provide for the accommodation of a tapering blade, or a blade whose shank portion is of a width narrower than the extremity of its cutting portion, an adjustable stop 28 is provided. This adjustable stop 28 is preferably a threaded stud mounted adjacent to the outer end of the knife-holding pocket and in alinement therewith. A tapering blade is inserted in the space between the plates 24 and 25 with its widest portion in engagement with the edge of the spacing strip 26 and its narrower portion engaging the stop 28, which is then adjusted to bring the cutting edge of the blade parallel to the manipulating rod 20.

In order to regulate the coöperative relation of the knife-holder to the grinding-wheel, adjustable stops 29 are clamped upon the rod 20. These stops 29 are oppositely disposed and provided with adjusting-screws 30 which are adapted to slidingly engage a guide-rod 31 to guide the manipulating mechanism during the reciprocation thereof. The length of travel of the manipulating mechanism in one direction is limited by the position of the stops 29 longitudinally of the rod 20 as said stops come in contact with the bearing 21. The return stroke of the mechanism is limited by an adjustable collar 32 secured on the rod 20 between the knife-holder and the bearing 21.

In the operation of the machine, the knife-holder is first adjusted to its proper coöperative relation to the grinding-wheel to sharpen the particular blade. This adjustment is accomplished by inserting the blade into the holder and turning the rod 20 until the cutting edge of the blade engages the periphery of the grinding-wheel. One of the stops 29 is adjusted on the rod 20 and secured thereto in such a position that its adjusting screw 30 engages the guide rod 31 on the side corresponding to the position of the cutting edge of the blade. The rod 20 is then turned to reverse the position of the cutting edge of the blade upon the grinding-wheel, and the other stop 29 adjusted so that its adjusting screw 30 will engage the side of the rod 31 corresponding to said reverse position of the blade. The manipulating mechanism is then reciprocated to move the cutting edge of the blade forward and backward across the rotating grinding wheel, and reversed from one side to the other as desired. Fine adjustments can be made when necessary by turning the adjusting screws 30.

When it is desired to adjust the grinding-wheel relative to the knife-holder, or to substitute wheels of different diameters, the bearing support for the spindle can be adjusted vertically by loosening the locking screw 18 and turning the adjusting nut 6 to raise or lower the post 15 as the case may be. When the proper adjustment has been attained, the locking screw is again tightened. Such adjustment varies the angle or bevel of the cutting edge of the blade. In some instances, it might be desirable to set the grinding-wheel at an acute angle relative to the cutting edge of the knife. In such a case, the locking screw 18 is withdrawn entirely from the groove 17, thus permitting the post to be turned in the bearings 3 and 4. When the locking screw is tightened it will not enter the groove but will impinge against the face of the post and prevent it from turning.

It is sometimes desirable that the outer faces of the knife-holder may be graduated or marked, as at 33, to indicate the proper positions in the holder for blades of different lengths, particularly tapering blades. Thus, when a blade of certain length and taper has been positioned in the holder with its end in register with one of the marks 33, and the stop 28 has been once adjusted, no further adjustment for the succeeding blades of the same size is necessary.

Motive power to rotate the grinding wheel may be supplied from any suitable source, the grooved pulley 9 being provided for a driving belt.

The knife X shown in the drawings is a representation of a tapering blade used in a cloth cutting machine, and is here shown to illustrate the purpose of the adjustable stop 28.

Obviously, my device is capable of considerable modification within the scope of my invention and therefore I do not wish to be limited to the specific construction shown and described.

What I claim as my invention and desire to secure by Letters Patent is:

1. A grinding machine comprising a frame, a grinding wheel adjustably mounted on said frame, a knife holding and manipulating mechanism, and means for adjusting said grinding wheel relative to said mechanism, said mechanism being adapted to reciprocate parallel with the axis of said wheel and being rotatably mounted relative to said axis, all arranged so that both sides of a knife therein may be brought into coöperative relation to said wheel without changing its relation to said mechanism.

2. A grinding-machine comprising a frame, a grinding-wheel adjustably mounted on said frame, a knife-holding and manipulating mechanism mounted on said frame in coöperative relation to said grinding-wheel, means for adjusting said grinding-wheel relative to said knife-holding and manipulating mechanism, and means for adjusting said knife-holding and manipulating mechanism relative to said grinding-wheel, said knife holding and manipulating mechanism being adapted to reciprocate parallel with the axis of said wheel and being rotatably mounted relative to said axis, all arranged so that both sides of a knife therein may be brought into coöperative relation to said wheel without changing its relation to said mechanism.

3. A grinding-machine comprising a frame, a grinding-wheel adjustably mounted on said frame, a knife-holding and manipulating mechanism mounted on said frame, means for adjusting said grinding-wheel relative to said knife-holding and manipulating mechanism, and means for adjusting said knife-holding and manipulating mechanism relative to said grinding-wheel, said last named adjusting means also constituting a guide for said knife-holding and manipulating means, said knife holding and manipulating mechanism being adapted to reciprocate parallel with the axis of said wheel and being rotatably mounted relative to said axis, all arranged so that both sides of a knife therein may be brought into coöperative relation to said wheel without changing its relation to said mechanism.

4. A grinding-machine comprising a frame, a knife-holding and manipulating mechanism mounted on said frame, a grinding-wheel adjustably mounted on said frame in coöperative relation to said knife-holding mechanism, and means for adjusting said wheel, said means comprising a wheel-bearing support having a post movably mounted in bearings in said frame, said post having a screw-threaded portion, a nut mounted between said bearings and engaging the threaded portion of said post, and means for locking said post in its bearings, said knife holding and manipulating mechanism being adapted to reciprocate parallel with the axis of said wheel and being rotatably mounted relative to said axis, all arranged so that both sides of a knife therein may be brought into coöperative relation to said wheel without changing its relation to said mechanism.

5. A grinding-machine comprising a frame, a grinding-wheel mounted on said frame, a knife-holding and manipulating mechanism reciprocatingly and reversibly mounted on said frame, and means for adjusting said knife-holding and manipulating mechanism relative to said grinding-wheel, said means also constituting a guide for said mechanism during the reciprocation thereof.

6. A grinding-machine comprising a frame, a grinding-wheel mounted on said frame, and a knife-holding and manipulating mechanism comprising a rod slidingly and rotatably mounted in a bearing on said frame, a knife-holder on said rod adapted to be moved across said grinding-wheel in coöperative relation thereto, a guide on said frame, and an adjustable stop on said rod adapted to engage said guide, whereby said knife-holding and manipulating mechanism may be adjusted and guided during the operation thereof.

7. A grinding-machine comprising a frame, a grinding-wheel mounted on said frame, and a knife-holding and manipulating mechanism comprising a rod mounted in a bearing on said frame, a knife-holder on said rod in coöperative relation to said grinding wheel, said knife holder comprising a grooved pocket having adjustable walls adapted to frictionally hold a knife in said knife-holder, and an adjustable stop adjacent to and in alinement with said grooved pocket.

8. A grinding-machine comprising a frame, a grinding-wheel mounted on said frame, a knife-holding and manipulating mechanism comprising a mounted rod, a knife-holder on said rod adjacent to said grinding-wheel, said knife-holder comprising a grooved pocket formed of two outer plates and an interposed plate of a width narrower than said other plates and forming a bottom for said pocket, and adjusting screws connecting said plates, and an adjustable stop adjacent to said pocket and in alinement therewith.

9. A grinding-machine comprising a frame, a grinding-wheel mounted on said frame, a knife-holder mounted upon a manipulating rod in proximity to said grinding-wheel, said manipulating rod being slidingly and rotatably mounted on said frame, a guide-rod secured to said frame parallel with said manipulating rod, and a stop adjustably secured on said manipulating rod and adapted to slidingly engage said guide-rod.

10. A grinding-machine comprising a frame, a grinding-wheel mounted on said frame, a knife-holder mounted upon a manipulating rod in proximity to said grinding-wheel, said manipulating rod being slidingly and rotatably mounted on said frame, a guide-rod secured to said frame parallel with said manipulating rod, and stops adjustably secured on said manipulating rod, one of said stops being adapted to slidingly engage the guide-rod on the side corresponding to the operative position of said knife-holder.

11. A grinding-machine comprising a frame, a grinding-wheel mounted on said frame, a knife-holder mounted upon a manipulating rod in proximity to said grinding-wheel, said manipulating rod being slidingly and rotatably mounted on said frame, a guide-rod secured to said frame parallel with said manipulating rod, and a stop adjustably secured on said manipulating rod and provided with an adjusting screw adapted to slidingly engage said guide-rod.

12. A grinding machine comprising a grinding-wheel and a knife-holding and manipulating mechanism, said mechanism being provided with a knife-holder adapted to accommodate tapering blades of different lengths, and having an adjustable stop for maintaining the cutting edge of said blades parallel with the axis of said manipulating mechanism, and means to indicate the proper position in said knife-holder of blades of like size after said stop has been adjusted.

13. A grinding machine comprising a grinding-wheel and a knife-holding and manipulating mechanism, said mechanism being provided with an elongated grooved knife-holder having laterally adjustable walls, and an adjustable stop in coöperative relation to said knife-holder adapted to maintain the cutting edge of knife-blades parallel with the axis of said manipulating mechanism, and means on said holder to indicate the proper position in said knife-holder of blades of different lengths.

14. A grinding-machine comprising a frame, a grinding-wheel mounted on said frame, and a knife-holding and manipulating mechanism in coöperative relation to said grinding-wheel and comprising a grooved pocket having adjustable walls adapted to frictionally hold a knife, and an adjustable stop adjacent to and in alinement with said grooved pocket.

15. A grinding machine comprising a frame, a grinding wheel mounted on said frame, a knife-holding and manipulating mechanism adjacent to said grinding wheel and comprising a grooved pocket formed of two plates and an interposed plate of a width narrower than said other plates and forming a bottom for said pocket, and adjusting screws connecting said plates, and an adjustable stop adjacent to said pocket and in alinement therewith.

Signed at St. Louis, Missouri, this 19th day of April, 1906.

JOHN B. GURY.

Witnesses:
J. B. MEGOWN,
ARTHUR G. REDWOOD.